J. A. BOLLER.
Upholsters' Pinchers.
No. 148,347.    Patented March 10, 1874.
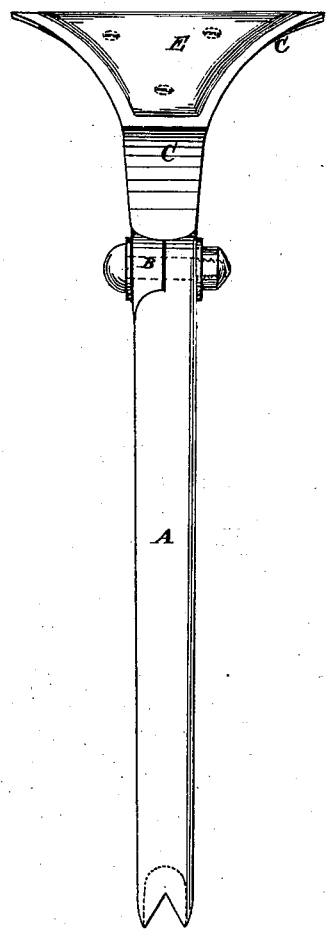
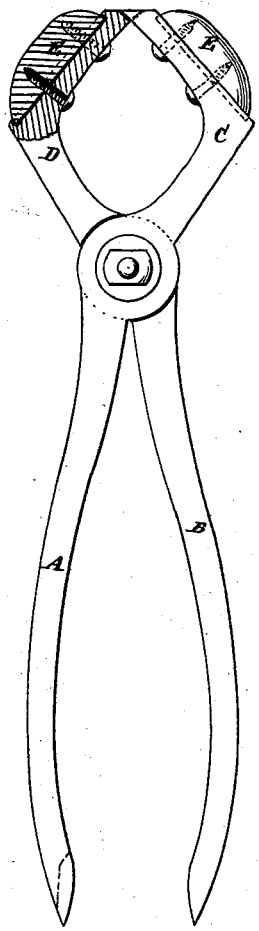
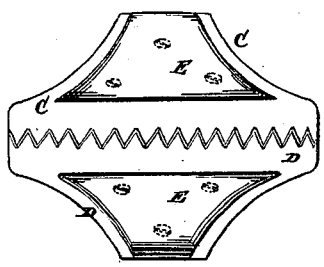
Witnesses:
A. W. Almqvist
C. Sedgwick
Inventor:
J. A. Boller
Per Munn & Co.
Attorneys.

UNITED STATES PATENT OFFICE.

JOSEPH A. BOLLER, OF CHICAGO, ILLINOIS.

IMPROVEMENT IN UPHOLSTERERS' PINCHERS.

Specification forming part of Letters Patent No. 148,347, dated March 10, 1874; application filed January 10, 1874.

*To all whom it may concern:*

Be it known that I, JOSEPH A. BOLLER, of Chicago, in the county of Cook and State of Illinois, have invented a new and useful Improvement in Upholsterer's Pinchers, of which the following is a specification:

Figure 1 is a front view of my improved pinchers. Fig. 2 is a side view of the same. Fig. 3 is a face view of the same.

Similar letters of reference indicate corresponding parts.

My invention has for its object to furnish an improved pinchers for stretching webbing upon sofas, chairs, and other articles of furniture, and which shall be so constructed that they may be used without danger of scratching or marring said furniture. The invention consists in the pinchers having the outer sides of their jaws flattened to adapt them to receive pads; and in the pads, in combination with the jaws of upholstering-pinchers, as hereinafter fully described.

A B are the handles of the pinchers, which are pivoted to each other in the ordinary manner, and upon their forward ends are formed the jaws C D. The jaws C D are made wide, and upon their edges are formed fine teeth interlocking with each other, so as to take a firm hold upon the webbing without danger of tearing it. The outer sides of the jaws C D are made flat, as shown in Fig. 2, to receive the pads E, which are secured in place by three or more screws passing through the said jaws and screwing into said pads. The pads E are made of rubber, of wood covered with plush or velvet, or of other suitable material, and their outer surfaces are rounded off, as shown in Fig. 2.

In using the pinchers, the webbing is tacked at one end, and is spread out in its place. The free end of the webbing is then doubled and grasped by the pinchers, which pinchers are operated with one hand to stretch and hold the webbing while it is being tacked with the other hand, the pads E protecting the work from being marred by the pinchers.

Having thus described my invention, I claim as new and desire to secure by Letters Patent—

The upholsterers' pinchers, with their jaws C D flattened upon the outer side, as shown, and provided with pads E, for the purpose described.

JOSEPH A. BOLLER.

Witnesses:
   J. FREDERICK BANYON,
   JOSEPH HOLDERNESS.